United States Patent [19]

Nakano

[11] Patent Number: 5,419,746
[45] Date of Patent: May 30, 1995

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 134,608

[22] Filed: Oct. 12, 1993

[30] Foreign Application Priority Data

Oct. 19, 1992 [JP] Japan ..................... 4-306083

[51] Int. Cl.⁶ ............................................. F16H 15/38
[52] U.S. Cl. ........................................ 476/10; 476/42
[58] Field of Search .................. 476/10, 41, 42, 46

[56] References Cited

U.S. PATENT DOCUMENTS 4,960,004 10/1990 Hibi et al. .................... 476/10

FOREIGN PATENT DOCUMENTS 61-124764 6/1986 Japan.

Primary Examiner—Allan D. Herrmann
Attorney, Agent, or Firm—Foley & Lardner

[57] ABSTRACT

A continuously variable traction roller transmission comprises a pair of eccentric shafts mounted to a pair of roller support members, each being disposed so that a line linking eccentric axes thereof is inclined with respect to the axial direction of a pair of rotation shanks.

1 Claim, 4 Drawing Sheets

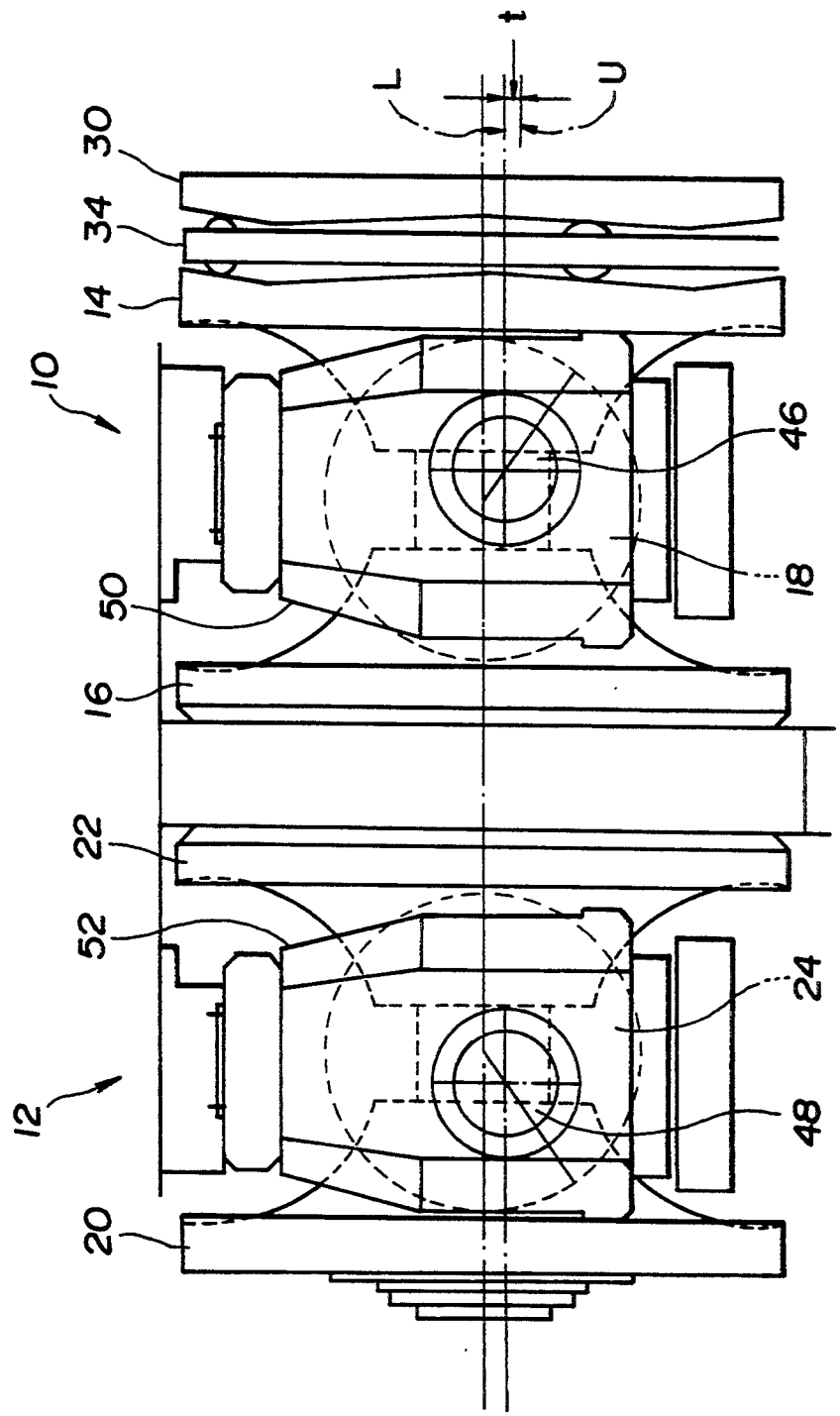

CONTINUOUSLY VARIABLE TRACTION ROLLER TRANSMISSION

BACKGROUND OF THE INVENTION

The present invention relates to a continuously variable traction roller transmission.

One of previously proposed continuously variable traction roller transmissions is disclosed, for example, in JP-A 61-124764. This continuously variable traction roller transmission comprises an input rotating disc connected to an input shaft, an output rotating disc disposed to face the input rotating disc, a pair of rollers disposed to contact opposed surfaces of the rotating discs for transmitting rotation of the input rotating disc to the output rotating disc, a pair of retainers for rotatably supporting the rollers through eccentric shafts each having a pair of eccentric and parallel rotation shaft portions, and a pair of tie rods for supporting the retainers and guiding movement in the direction of tangent lines of the rotating discs and rotation in the direction of movement so as to tilt the rollers and change a contact position thereof with the rotating discs, each tie rod being supported by a support pin arranged in the opposed direction of the rotating discs to be rotatable about the support pin. Input torque operates to press down one of the rollers, and press down the other thereof. The other roller produces an upward offset. When input torque operates this offset roller, each eccentric shaft is swung on the rotation shaft portion thereof supported by the retainer which is rotated simultaneously about the tie rod as a support shaft for rotating the roller, thus achieving decelerating action. Upon deceleration action, the retainer is moved upward by swing of the eccentric shaft. In accordance with upward displacement and rotational displacement of the retainer, a cam connected to the retainer is operated to move a shift control valve through the cam. Thus, a hydraulic piston for vertically driving the retainer undergoes hydraulic pressure against upward movement of the retainer. When force due to hydraulic pressure balances with upward force of the retainer, an offset of the roller becomes null, so that a shift ceases. Likewise, the one roller produces a downward offset, and carries out similar deceleration action.

As to the known continuously variable traction roller transmission, however, even if the shift valve does not operate, an increase in input torque causes a shift on the deceleration side due to elastic deformation of a disc, etc. Moreover, the pair of eccentric and parallel rotation shaft portions of the eccentric shaft are disposed to have a positional relationship where the retainer has less upward and downward movement due to swing of the eccentric shaft, so that when actuating the shift control valve to produce within the hydraulic piston hydraulic pressure against upward force of the retainer, it is necessary to rotate extra on the deceleration side the cam for feed backing movement of the retainer to the shift control valve, resulting in extra deceleration. Thus, the speed ratio is changed with torque variations, resulting in a difficult logic of shift control, or engine over-rotation.

It is, therefore, an object of the present invention to provide a continuously variable traction roller transmission which enables a reduction in variation of the speed ratio due to torque increase.

SUMMARY OF THE INVENTION

There is provided, according to the present invention, a continuously variable traction roller transmission, comprising:

input and output discs, said input and output discs defining a toroidal concavity, said input and output discs having axes;

a pair of traction rollers disposed in said toroidal concavity of said input and output discs;

a pair of roller support members arranged to rotatably support said pair of traction rollers, each of said pair of roller support members having a pair of rotation shanks which cross said axes of said input and output discs at right angles, said pair of rotation shanks supporting rotatably and movably in an axial direction thereof said each of said pair of roller support members;

a pair of eccentric shafts mounted to said pair of roller support members for supporting said pair of traction rollers, each of said pair of eccentric shafts having eccentric axes, said each of said pair of eccentric shafts being disposed so that in a non-loading state, a line linking said eccentric axes is inclined with respect to said axial direction of said pair of rotation shanks, said line being inclined in such a direction that elastic deformation of said pair of input and output discs and said pair of traction rollers contributes to move said pair of roller support members to reduce a variation of a speed ratio of said input disk to said output disk in accordance with a torque increase; and a hydraulic cylinder apparatus arranged to drive said pair of roller support members in said axial direction of said pair of rotation shanks.

BRIEF DESCRIPTION OF THE DRAWINGS

FIG. 4 is a view similar to FIG. 3, showing the continuously variable traction roller transmission upon loading.

DETAILED DESCRIPTION OF THE INVENTION

Figure 1:
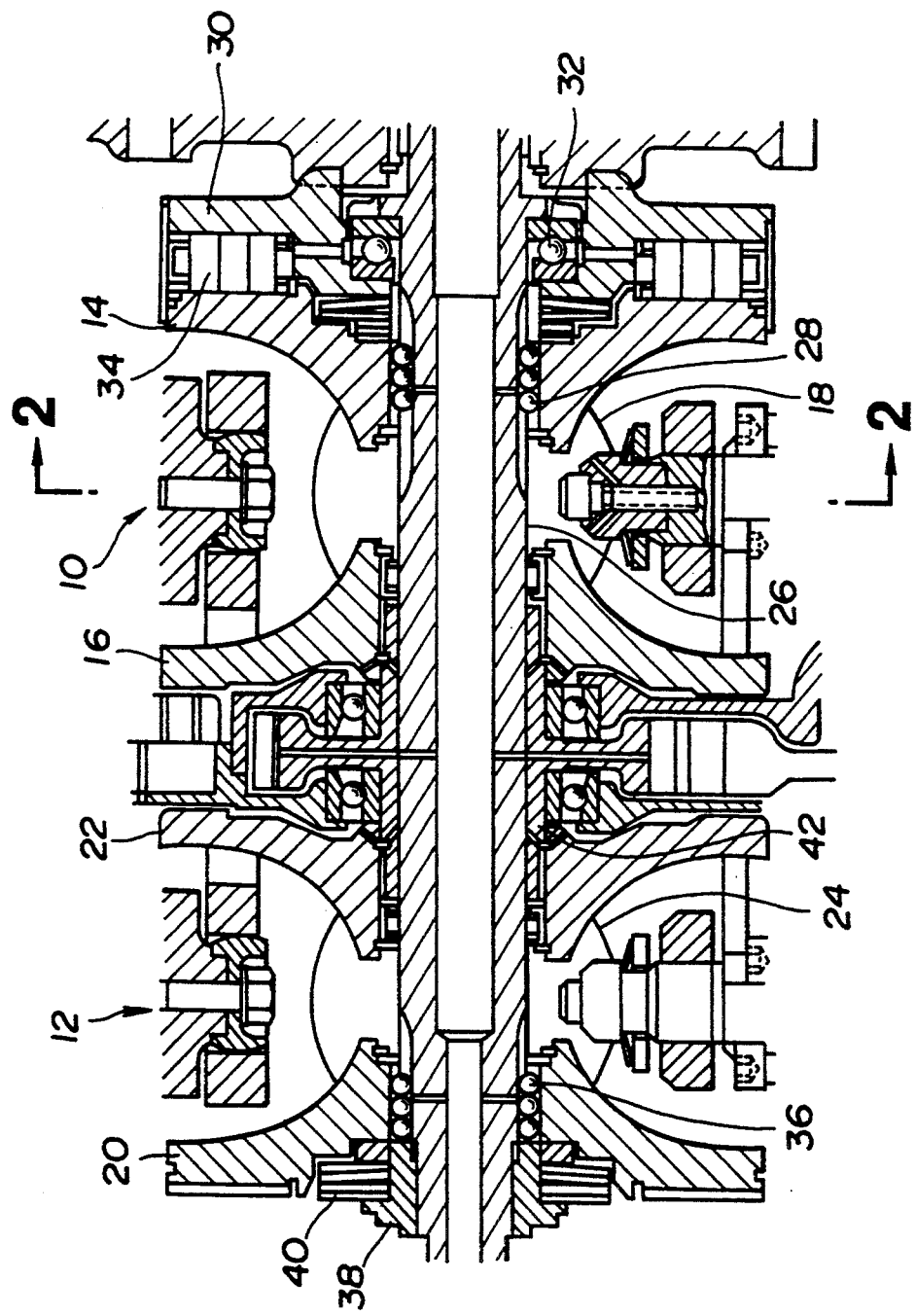
FIG. 1 is a longitudinal section showing a continuously variable traction roller transmission to which the present invention is applied.

Referring to FIG. 1, a continuously variable traction roller transmission includes a first continuously variable traction roller transmission unit 10 and a second continuously variable traction roller transmission unit 12 disposed in parallel. The first traction roller transmission unit 10 comprises a first input disc 14, a first output disc 16, and a pair of first traction rollers 18 for transmitting torque between the two. A contact surface of each of the first input disc 14 and the first output disc 16 with each of the first traction rollers 18 is formed in a toroid. By changing a contact state of the first traction rollers 18 with the first input disc 14 and the first output disc 16, the rotational speed ratio of the first input disc 14 to the first output disc 16 can continuously be altered. In a manner similar to the first traction roller transmission unit 10, the second traction roller transmission unit 12 comprises a second input disc 20, a second output disc 22, and a pair of second traction rollers 24. However, arrangement of the second input disc 20 and the second output disc 22 is opposite to the first input disc 14 and the first output disc 16. That is, the first output disc 16 and the second output disc 22 are disposed adjacent to each other. The first input disc 14 is supported to an input shaft 26 on the outer periphery thereof through a ball spline 28. A cam flange 30 is arranged to the first input disc 14 on the rear side thereof. The cam flange 30 is axially supported to the input shaft 26 by a thrust bearing 32. A cam roller 34 is disposed between facing cam surfaces of the cam flange 30 and the first input disc 14. The cam surfaces of the cam flange 30 and the cam roller 34 have such a shape as to produce force for biasing the first input disc 14 toward the first output disc 16 when the first input disc 14 and the cam flange 30 make relative rotation. Likewise, the second input disc 20 of the second traction roller transmission unit 12 is connected to the input shaft 26 through a ball spline 36. The second input disc 20 undergoes force toward the second output disc 22 by a disc spring 40 which in turn undergoes compressive force from a loading nut 38 engaged with the input shaft 26. The first output disc 16 of the first traction roller transmission unit 10 and the second output disc 22 of the second traction roller transmission unit 12 are arranged to be rotatable together with an output shaft 42 which is rotatably supported to the input shaft 26.

Figure 2:
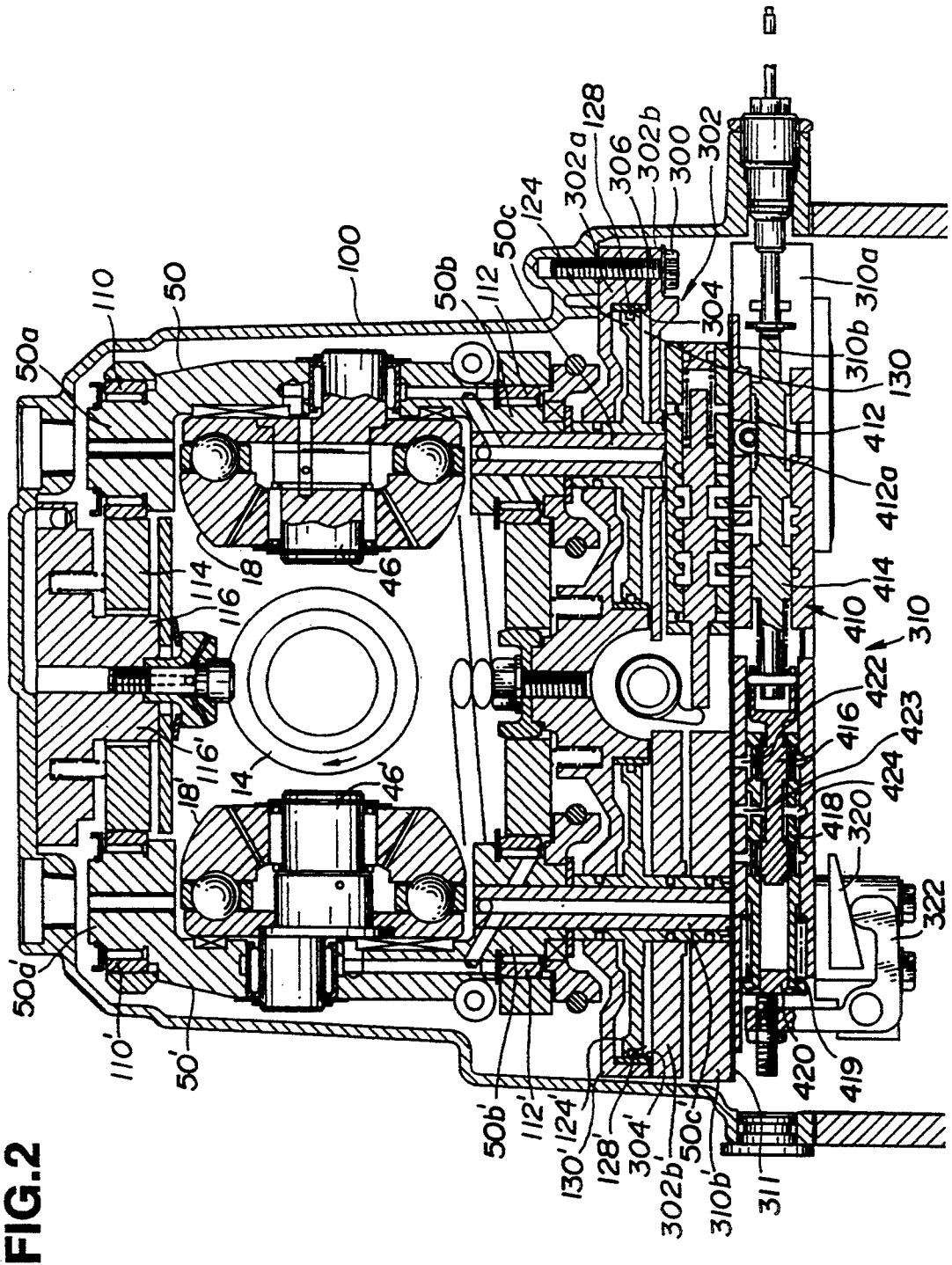
FIG. 2 is a fragmentary cross section taken along the line 2—2 in FIG. 1.

Referring to FIG. 2, the first traction roller transmission unit 10 comprises a roller support member 50 which is rotatably and vertically movably supported by spherical bearings 110, 112 to upper and lower rotation shanks 50a, 50b. The first traction roller 18 is rotatably supported to the roller support member 50 through an eccentric shaft 46. The first input disc 14 is rotated in the direction of an arrow as shown in FIG. 2, transmitting torque to the first traction roller 18. The spherical bearing 110 is supported by a link 114 which is in turn supported by a link post 116 secured to a casing 100. The roller support member 50 has an extension shank 50c. concentrically arranged to the rotation shank 50b. The extension shank 50c is so constructed as to rotate together with the rotation shank 50b. A piston 124 is disposed to the extension shank 50c on the outer periphery thereof. The piston 124 is inserted in a piston insertion bore 304 formed in a main cylinder body 302a which is mounted to the casing 100 by a bolt 300. Mounted to the main cylinder body 302a on the under side thereof is an auxiliary cylinder body 302b secured with the main cylinder body 302a by the bolt 300 through a separate plate 306. The main cylinder body 302a and the auxiliary cylinder body 302b constitute a cylinder body 302. Thus, hydraulic chambers 128, 130 are formed on the upper and lower sides of the piston 124 which is vertically movable by hydraulic pressure applied thereto. It is to be noted that in FIG. 2, the left hydraulic chambers 128', 130' are arranged to be vertically opposite to the right hydraulic chambers 128, 130. The piston 124 and the piston insertion bore 304 of the main cylinder bore 320a constitute a hydraulic cylinder apparatus.

A valve body 310 is disposed below the cylinder body 302. The valve body 310 comprises a main valve body 310a, and an auxiliary valve body 310b mounted on the upper side thereof through a separate plate 311. A shift control valve 410 is disposed in the valve body 310. The shift control valve 410 comprises a stepper motor 412 rotated in accordance with the speed ratio as commanded, a spool 414 with a rack having teeth engaged with a pinion 412a driven by the stepper motor 412 and being axially movable by rotation of the stepper motor 412, a spool 416 having one end connected to the spool 414 with the rack and being axially movable therewith by rotation of the stepper motor 412, a sleeve 416 disposed to the spool 416 on the outer periphery thereof, a spring 419 for biasing the sleeve 418 leftward as viewed in FIG. 2, and a retainer 420 engaged with the sleeve 418 at the outside end thereof. Hydraulic passages 422, 424 are arranged to the valve body 310a. The hydraulic passage 422 is connected to the hydraulic chamber 128, whereas the hydraulic passage 424 is connected to the hydraulic chamber 130. Line pressure of the hydraulic passage 423 serving as a hydraulic source is distributed to tile hydraulic passages 422, 424 in accordance with the relative positional relationship between the spool 416 and the sleeve 418. That is, the relationship between a land of the spool 416 and an oil groove of the sleeve 418 is established so that in the normal state as shown in FIG. 2, hydraulic pressure within the hydraulic passage 422 is equal to that one within the hydraulic passage 424, whereas when the spool 416 is relatively moved leftward as viewed in FIG. 2, hydraulic pressure within the hydraulic passage 424 is higher than that one within the hydraulic passage 422, and when the spool 416 is relatively moved rightward as viewed in FIG. 2, hydraulic pressure within the hydraulic passage 424 is lower than that one within the hydraulic passage 422. Arranged to the extension shank 50c at the lower end thereof is a cam 320 which is rotatable together therewith. The cam 320 has a bevel with which a link 322 is in contact. Thus, with the cam 320 rotated, the link 322 is swung, so that a pointed end thereof can press the retainer 420.

It is to be noted that the fundamental constitution of the second traction roller transmission unit 12 is the same as that one of the first traction roller transmission unit 10.

Figure 3:
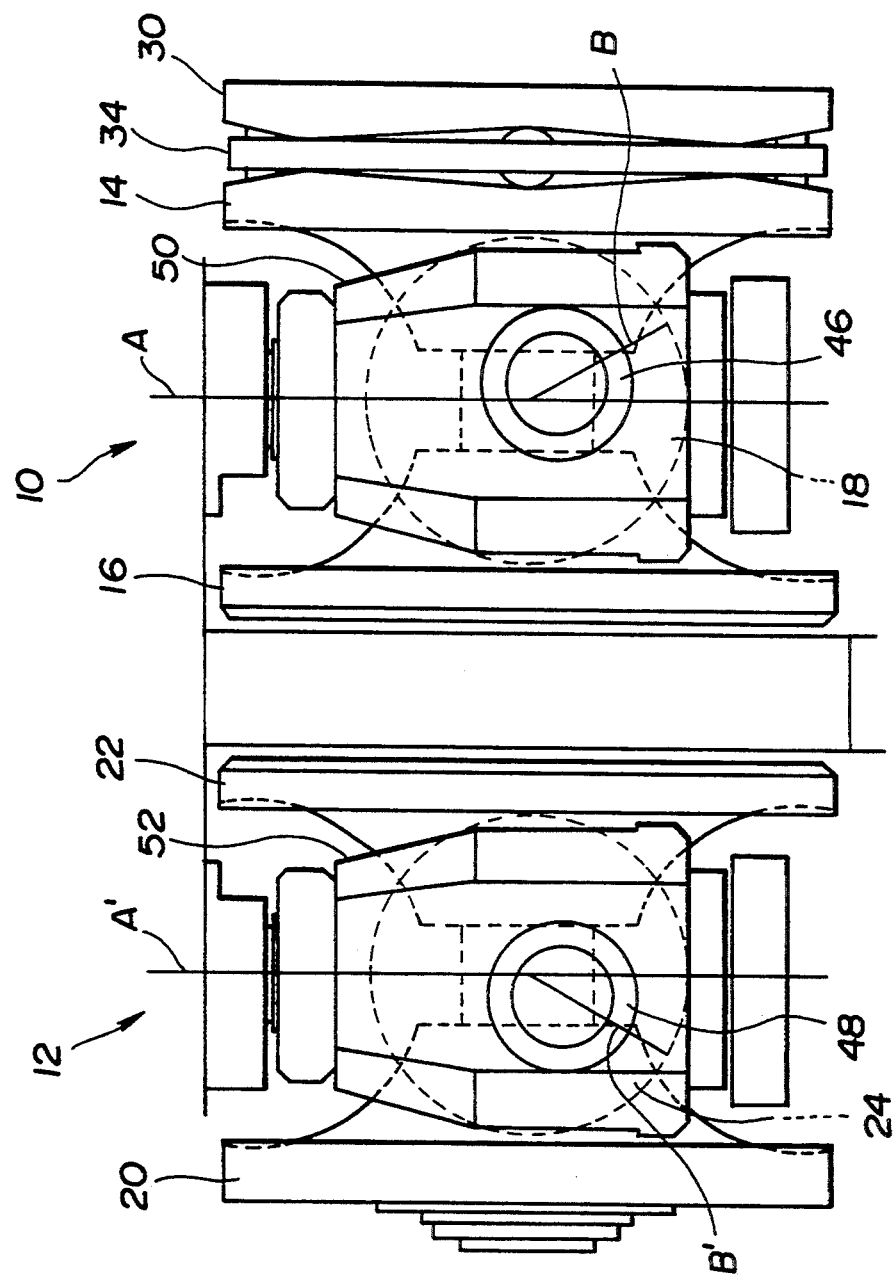
FIG. 3 is a fragmentary schematic view showing the continuously variable traction roller transmission upon non-loading.

Referring to FIG. 3, as described above, the first traction rollers 18, 24 are rotatably mounted to the roller support members 50, 52 as indicated by broken lines in FIG. 3 through the eccentric shafts 46, 48, respectively. Each eccentric shaft 46, 48 is mounted so that in a non-loading state, a line B, B' linking two eccentric axes thereof is inclined with respect to the axial direction or a line A, A' of the roller support member 50, 52. The inclined direction of the line B, B' with respect to the line A, A' is such that elastic deformation of the disc, traction roller, etc. upon torque increase serves to increase upward movement of the roller support member 50, 52.

Next, operation of this embodiment will be described. Upon non-loading, the first traction roller transmission units 10, 12 are in a state as shown in FIG. 3. From this state, with torque of the input shaft 26 increased, the first input disc 14 rotates in following the cam roller 34 by operation of the cam flange 30, and generates simultaneously thrust corresponding to input torque of the input shaft 26. Thus, the first input disc 14 has increased force for pressing the first traction roller 18, so that the first input disc 14, first output disc 16, first traction roller 18, etc. make elastic deformation. In this state, power transmission is carried out from the first input disk 14 to the first output disc 16. The first traction roller 18 is swung on a shaft portion of the eccentric shaft 46 supported by the roller support member 50, i.e, the line B is rotated counterclockwise, urging the roller support member 50 upward as viewed in FIG. 3. Referring also to FIG. 4, at this time, the shaft portion of the eccentric shaft 46 on the side of the roller support member 50 has a center moved upward by a distance "t" from the state as shown in FIG. 3, becoming in a state as shown in FIG. 4. That is, the roller support member 50 is urged upward by the eccentric shaft 46 by the distance "t". In FIG. 4, the line designated as U represents the center line of eccentric shafts 46, 48 upon non-loading and the line designated as L represents the center line of eccentric shafts 46, 48 upon loading. Referring also to FIG. 2, rotation of the left roller support member 50' moved upward is input to the retainer 420 of the shift control valve 410 through the cam 320 and the link 322, so that the retainer 420 is moved rightward as viewed in FIG. 2. As a result, hydraulic pressure within the hydraulic passage 424 is increased, obtaining an increase in hydraulic pressure within the hydraulic chamber 130. Therefore, the roller support member 50 undergoes downward force which puts the roller support member 50 in an equilibrium state, ceasing a shift. Reacted force due to the hydraulic cylinder apparatus is increased by a part corresponding to the distance "t" of the roller support member 50, putting the roller support member 50 in the equilibrium state, resulting in a reduced variation of the speed ratio due to torque increase.

It is to be noted that operation of the second traction roller transmission unit 12 is the same as that one of the first traction roller transmission unit 10.

What is claimed is:

1. A continuously variable traction roller transmission, comprising:
   input and output discs, said input and output discs defining a toroidal concavity, said input and output discs having axes;
   a pair of traction rollers disposed in said toroidal concavity of said input and output discs;
   a pair of roller support members arranged to rotatably support said pair of traction rollers, each of said pair of roller support members having a pair of rotation shanks which cross said axes of said input and output discs at right angles, said pair of rotation shanks supporting rotatably and movably in an axial direction thereof said each of said pair of roller support members;
   a pair of eccentric shafts mounted to said pair of roller support members for supporting said pair of traction rollers, each of said pair of eccentric shafts having eccentric axes;
   means for setting said each of said eccentric shafts so that in a non-loading state, a line linking said eccentric axes is inclined with respect to said axial direction of said pair of rotation shanks, said line being inclined in such a direction that elastic deformation of said pair of input and output discs and said pair of traction rollers serves to move said pair of roller support members so as to reduce a variation of a speed ration of said input disk to said output disc in accordance with a torque increase; and
   a hydraulic cylinder apparatus arranged to drive said pair of roller support members in said axial direction of said pair of rotation shanks.

* * * * *